Nov. 3, 1942.　　　　H. PHILLIPS　　　　2,300,746
CLAMP
Filed Sept. 18, 1940　　　2 Sheets-Sheet 1
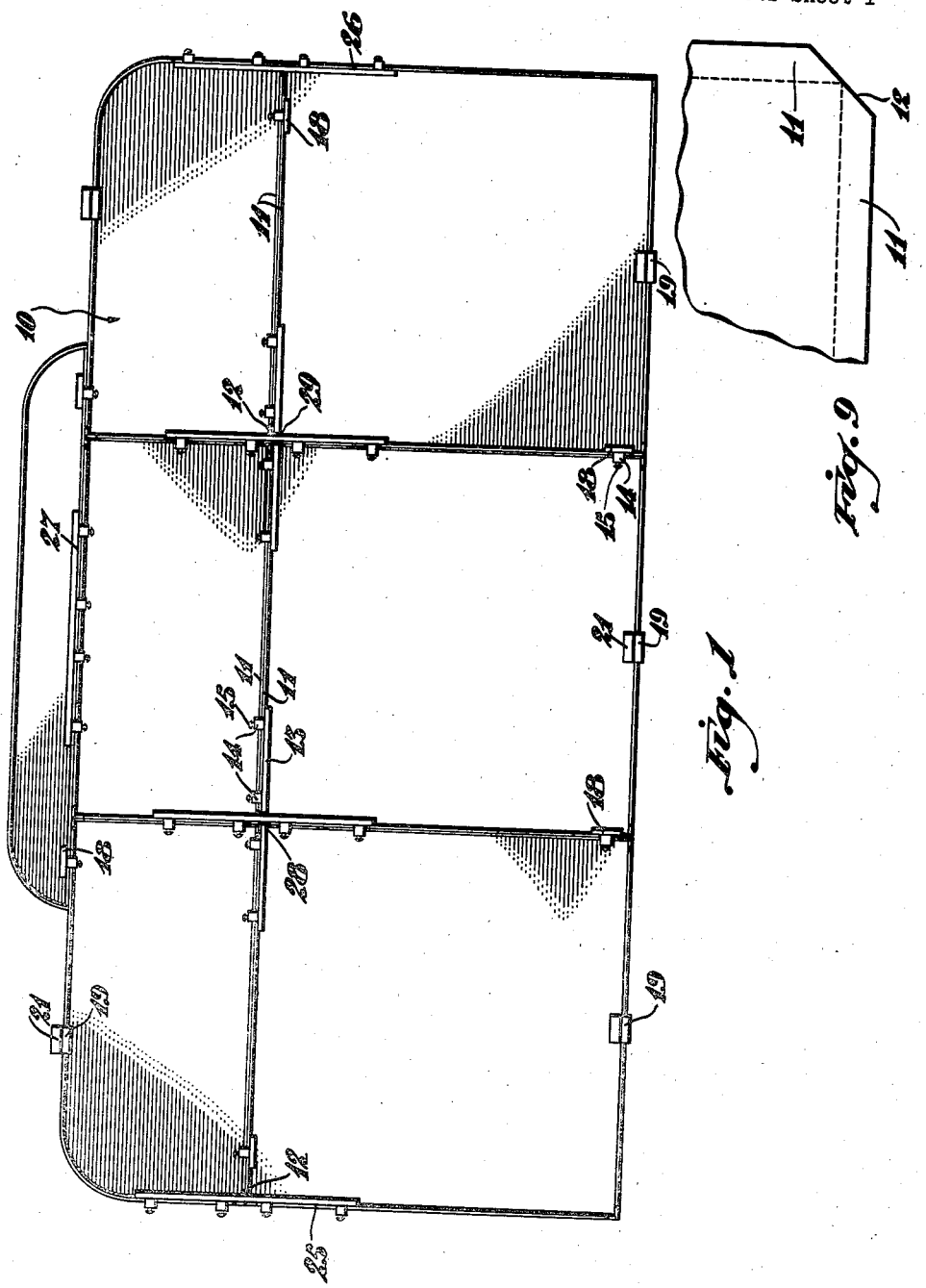
INVENTOR.
BY Hyman Phillips
Wood & Wood
ATTORNEYS Nov. 3, 1942.　　　　　H. PHILLIPS　　　　　2,300,746
CLAMP
Filed Sept. 18, 1940　　　　2 Sheets-Sheet 2
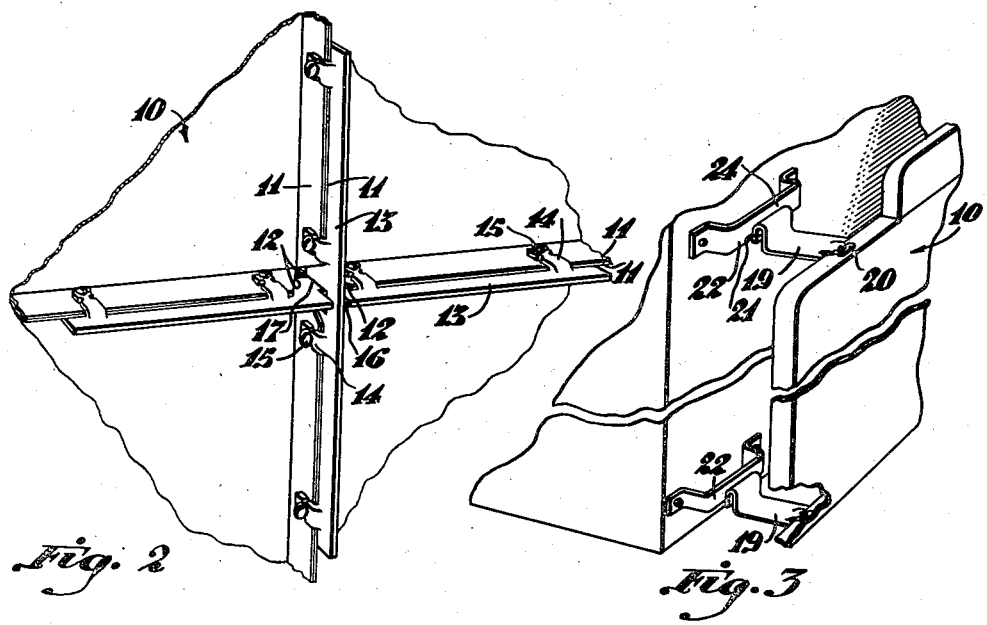
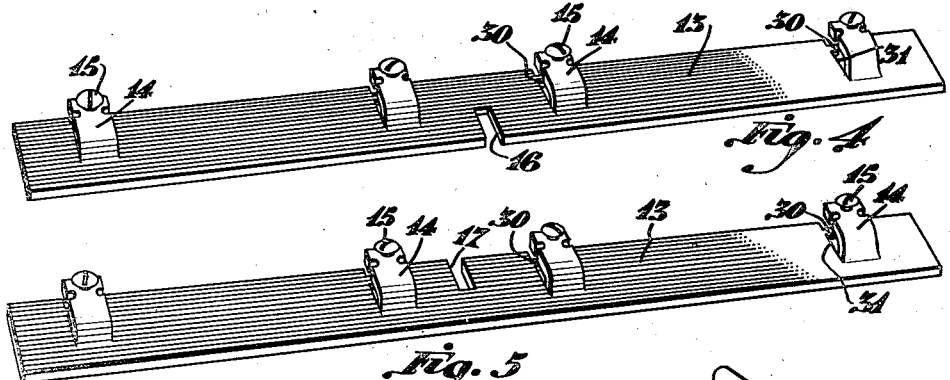
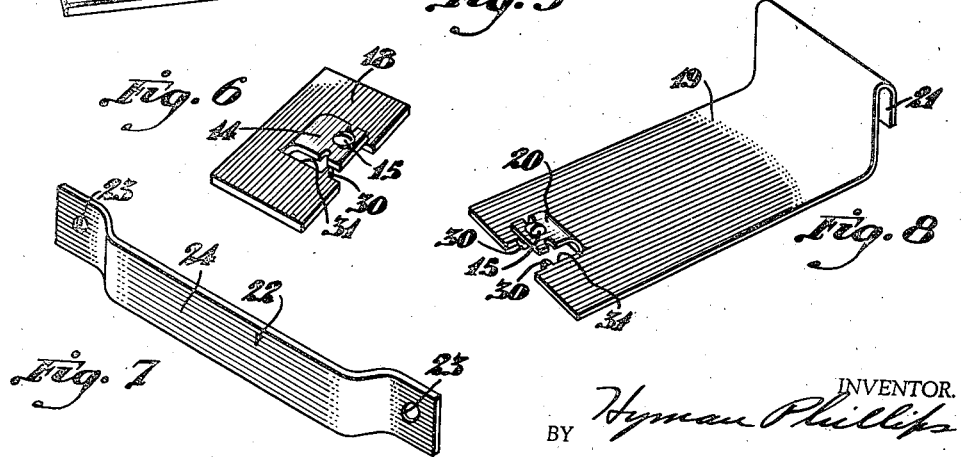
INVENTOR.
BY Hyman Phillips
Word.Word
ATTORNEYS Patented Nov. 3, 1942

2,300,746

UNITED STATES PATENT OFFICE 2,300,746

CLAMP

Hyman Phillips, Cincinnati, Ohio, assignor to The Phillips Pump & Tank Company, Cincinnati, Ohio, a corporation of Ohio Application September 18, 1940, Serial No. 357,300

7 Claims. (Cl. 189—36)

This invention relates generally to clamps. More particularly, it is directed to clamps which are utilized to fasten together and brace sheet metal panels.

Decorative sheet metal panels have become widely used as backgrounds for lubrication departments in the larger service stations and as backgrounds for displays of other kinds. These backgrounds are ordinarily built up from a number of small sheet steel panels. The manufacturers supply, possibly, twelve or fourteen standard sized panels, and by fastening them together in different combinations it is possible to fabricate an almost infinite variety of displays. Sheet metal panels also are being used extensively for concrete forms since they may be used many times before they must be discarded. Here again the sheets are furnished in small panels which are fastened together to make a form of the desired size.

In the past, these panels have been fastened together by bolts which were put through holes in flanges turned inwardly from the edges of the sheets. In most instances difficulty arose when the panels were being fastened together because the holes in two adjacent flanges were frequently out of line. Consequently, it was necessary to use a drift pin to align the holes or in some instances resort to the use of a drill or a punch.

The present inventor has conceived a simple bracing clamp which is constituted by a narrow strip of metal having one or a plurality of lugs stamped from one edge thereof. The inside faces of the lugs are spaced from the adjacent surface of the body portion of the clamp in parallel relationship therewith to provide jaws between which the abutting flanges of adjacent panels may be clamped by screws which are threaded through the lugs. The inventor has provided these clamps so that they may be crossed to secure and brace the corner joint between four panels or used separately to fasten together and brace the joint between two panels.

A primary object of the present inventor has been to provide a clamp which braces the sheet metal panels while holding them together. Another object has been to provide a simple clamp which firmly secures together pieces of sheet metal without the necessity of drilled holes through them.

A further object has been to provide a clamp which is so simply fabricated that it can be manufactured in a few operations without the use of expensive machinery, castings or dies. An outstanding advantage of the clamp is that it is easily manufactured and easily set in position, and yet provides a strong, sure, structural brace for the panels.

Other objects and certain advantages of my invention may be seen from a description of the drawings in which:

Figure 1 is a rear view of a panel background assembly illustrating the various positions in which the clamp may be utilized.

Figure 2 is a fragmentary perspective view showing the manner in which a pair of the clamps is utilized to secure the joint between four panels.

Figure 3 is a fragmentary view illustrating a pair of wall brackets for a background assembly.

Figure 4 is a perspective view of the bracing clamp.

Figure 5 is a perspective view of the mate to the clamp shown in Figure 4.

Figure 6 is a perspective view of a small auxiliary clamp which may be utilized in a background assembly.

Figure 7 is a perspective view of a wall strap used within the wall brackets.

Figure 8 is a perspective view of a hanger forming part of the wall bracket.

Figure 9 is a back view of one of the panel blanks illustrating the manner in which the corners are cut out before the flanges are turned inwardly.

The bracing clamp in its various forms has many uses, but its use is particularly directed to clamping together sheet metal panels as disclosed by the following description wherein the clamp is utilized to secure together decorative sheet metal panels to fabricate a background for displays.

A background assembly 10 is illustrated in Figure 1. A right angle flange 11 extends around the edge of the rear face of each panel. The right angle corners of each panel are cut angularly before the flange is bent over so that a cutout portion 12 (see Figures 2 and 9) exists in the flange at every corner.

The body of the clamp is constituted by a narrow strip of metal 13 which has a plurality of lugs 14 stamped from one edge thereof. A screw 15 is threaded through each lug from its outer face. The inner face of each lug 14 is spaced from the adjacent surface of the strip 13 to permit the abutting flanges 11—11 of adjacent panels to be slipped between the lug and the strip. When all of the screws 15 are tightened, the flanges are gripped together and held against the body portion of the clamp. Therefore, the panels are not only secured together but are stiffened and braced by the clamp.

The clamps are provided in pairs for securing and bracing the corner joints between four panels. The opposite side edges of each clamp of the pair are slotted medially of the length of each clamp. In the instance shown, there are two lugs on each side of the slot in each clamp of the pair. The slots are indicated at 16 and 17 respectively in the pair of clamps shown in Figures 4 and 5 of the drawings. The slot 16 appears on the opposite side of the lugs on the clamp shown in Figure 4. For simplification, this clamp will be referred to as the left hand clamp. The slot 17 appears on the same side as the lugs in Figure 5 and this one will be referred to as the right hand clamp. The slots extend to the middle line of each clamp and the slots are wide enough to receive the body 13 of the companion clamp.

In Figure 6, an auxiliary clamp 18 is shown. It comprises a short strip of metal of the same width and thickness as the main clamps, but, in this instance the clamp 18 carries only one lug.

A wall bracket hanger 19 appears in Figure 8. The hanger comprises a strip of metal having a lug 20 at one end thereof and an inverted U-shaped hook 21 at the other end. The lug 20 is formed in the same fashion as the lugs 14. The hook is formed by bending one end of the strip of metal upward and over and downward. The lug is slipped over a flange of a panel and the bolt 15 tightened, and the other, or hook end 21, is slipped over a wall strap 22.

The strap 22 is provided with bolt holes 23 so that it may be fastened to a wall. The middle section of the strap at 24 is bent outward from the two ends containing the holes 23 so that the hanger can be easily slipped over it. The purpose of the wall bracket is to hold the background assembly in an upright position. These brackets may be provided in different lengths depending on the clearance between wall and background necessary to allow for pipes and other obstructions.

The decorative panels are assembled into backgrounds by laying the panels face down in the pattern desired. This leaves the flanges extending upward with the flanges of adjacent panels lying side by side.

The various positions of the bracing clamps and brackets are shown in Figure 1 of the drawings. Single clamps are utilized at points 25, 26, and 27, while pairs of clamps are used at points 28 and 29. It will be noted that the bodies 13 of the clamps are positioned to one side of the flanges and pass through the previously referred to cut-out portions 12 of the flanges. At each of the points 25 and 26, the lugs enclose only one flange, and in these instances the clamps are employed as braces. At point 27 the lugs of the clamp enclose two flanges, and in this instance the clamp is employed to hold the two adjacent panels together.

At each of the two points 28 and 29, a pair of clamps is employed to brace and secure the joint between four panels. In the instance shown, first the longitudinal flanges of the adjacent panels are secured by the left hand clamp with the opening of the slot 16 upward. The clamp is positioned so that the slot is to one side of the line of the lateral flanges. The other, or right hand clamp, is then placed so that its lugs enclose the lateral flanges. The slot 17 and slot 16 are aligned and when the clamp is slipped into place, the two slots couple.

After the single bracing clamps and the pairs of bracing clamps are in place, the smaller auxiliary clamps 18 and the hanger brackets 19 are placed as shown in Figure 1.

These bracing clamps prove quite effective. A background comprised of approximately twenty panels and measuring approximately eighteen feet by eight feet can be assembled while lying face downward and then can be raised to an upright position by being lifted from the two ends without visible bending of the unit.

As the lugs 14 are stamped from one edge of the clamp, there is an opening 31 left in this edge when the lugs are bent upward into position to receive the flanges 11—11. As a result, there may be a tendency for the flanges of thinner type panels to buckle and consequently distort the face of the panel, when the screws 15 are tightened. To overcome this, a pair of ears 30—30 are stamped from each lug 14 to form a more substantial base, against which the flanges are clamped. Preferably, the ears 30—30 are positioned to extend into the opening 31 as near the axis of the screw 15 as possible. Thus, the base provided by the ears is in the pressure area of the screw.

The throat provided between the under face of each lug and the body portion of the clamp can be made as deep as the flanges to be clamped together are wide. This brings the inner edge of the body of the clamp into the corner between the flange and panel when the clamp is installed. Thus, the resistance against warping of the flange of the panel is substantially increased by the abutting face and side edge of the body of the clamp.

Having described my invention, I claim:

1. A clamp assembly adapted to fasten together sheet metal panels of the type having marginal flanges, the flanges of adjacent panels lying in abutment, said assembly consisting of a pair of bars, the elements of which are arranged in criss-cross arrangement, each of said bars including a slot intermediate its ends, said slots registering for permitting said bars to be disposed in the same plane at right angles to each other, each of said bars including lugs struck from the surface of the bar and providing throats into which said abutting flanges are inserted and, means for fixing said abutting flanges within said throats.

2. A clamp assembly adapted to fasten together four rectangular sheet metal panels of the type having marginal flanges, the flanges of adjacent panels lying in abutment, said assembly consisting of a pair of bars, the elements of which are arranged in cross-cross arrangement on the abutting pairs of flanges, said bars including registering slots for this purpose, each of said bars including lugs struck from its surface and providing throats into which said abutting flanges are inserted and means for fixing said abutting flanges within said throats.

3. In a clamp of the type comprising a bar element having a plurality of lugs stamped from one edge thereof and a screw threaded through each lug to clamp sheet material between the lower face of the lug and the adjacent face of the bar, a pair of ears, formed from the body of each lug, when the lug is stamped from the bar, said ears extending into the opening left in the bar when the lug is stamped therefrom, in the area substantially beneath the screw.

4. A clamp for fastening together metal sheets, comprising a bar element having a plurality of lugs struck from one edge thereof to provide throats between the inner faces of the lugs and the adjacent face of the bar, screws threaded through the lugs, and ears cut out of the lugs when they are stamped from the bar, said ears extending under the lugs as a continuation of the bar element to provide a base for supporting said metal sheets when the bolts are tightened to clamp and fasten the sheets.

5. A clamp for fastening together and bracing the engaged sheet metal flanges of adjacent panels, comprising an element having a lug stamped from one edge thereof, a screw threaded through said lug to clamp the sheet metal flanges between the lower face of the lug and the adjacent face of the element, and a pair of ears formed from the body of the lug when the lug is stamped from the element, said ears extending into the opening left in the element when the lug is stamped therefrom and disposed in the area substantially beneath the screw.

6. In combination, sheet metal panels having abutting flanges, an elongated bar element having a plurality of lugs formed in one edge thereof, said lugs constituted along lines cut into the edge of the bar transversely of the bar with the lugs displaced from the plane of the bar, the abutting flanges being disposed between the lugs and the bar so that the plurality of lugs overhangs the flanges and the bar has the effect of stiffening the flanges, and a screw in each lug extended through the lug and engaging the flanges against the body of the bar.

7. In combination, a panel having extended flanges, an elongated bar for securing said panel to a wall, said bar having a lug formed in one end thereof, the side edges of the said lug being disposed longitudinally of the bar, and said lug being formed from the body of the bar and bent into a plane parallel to the bar and spaced therefrom providing a throat into which the flange of the panel is inserted, the other end of said bar including attaching means for securing the bar to the wall.

HYMAN PHILLIPS.